US008831630B2

(12) United States Patent
Bentley

(10) Patent No.: US 8,831,630 B2

(45) Date of Patent: Sep. 9, 2014

(54) TRACKING AND COMMUNICATIONS DEVICE

(75) Inventor: Spencer Bentley, Worcester (GB)

(73) Assignee: LOK8U Limited, Worcestershire (GB)

( * ) Notice: Subject to any disclaimer, the term of this patent is extended or adjusted under 35 U.S.C. 154(b) by 0 days.

(21) Appl. No.: 13/318,081

(22) PCT Filed: Apr. 26, 2010

(86) PCT No.: PCT/GB2010/000842

§ 371 (c)(1), (2), (4) Date: Jan. 17, 2012

(87) PCT Pub. No.: WO2010/125338

PCT Pub. Date: Nov. 4, 2010

(65) Prior Publication Data

US 2012/0115506 A1 May 10, 2012

(30) Foreign Application Priority Data

Apr. 29, 2009 (GB) .................................. 0907361.0
Jan. 29, 2010 (GB) .................................. 1001481.9

(51) Int. Cl.
*H01Q 1/24* (2006.01)
*H04W 24/00* (2009.01)
*H01Q 5/00* (2006.01)

(52) U.S. Cl.
CPC ............... *H01Q 5/00* (2013.01); *H01Q 5/0034* (2013.01)
USPC ........................................ 455/456.1; 343/702

(58) Field of Classification Search
USPC ........... 455/456.1, 553.1; 340/573.1; 343/702
See application file for complete search history.

(56) References Cited

U.S. PATENT DOCUMENTS

| | | | | |
|---|---|---|---|---|
| 5,771,001 | A | 6/1998 | Cobb | |
| 6,016,125 | A * | 1/2000 | Johansson | 343/702 |
| 6,239,751 | B1 * | 5/2001 | McRae et al. | 343/700 MS |
| 6,662,021 | B2 * | 12/2003 | Kang et al. | 455/553.1 |
| 7,148,851 | B2 * | 12/2006 | Takaki et al. | 343/702 |
| 7,932,863 | B2 * | 4/2011 | Pros et al. | 343/702 |
| 2004/0248586 | A1 * | 12/2004 | Patel et al. | 455/456.1 |
| 2005/0190107 | A1 * | 9/2005 | Takagi et al. | 343/702 |
| 2005/0205021 | A1 | 9/2005 | Shute | |
| 2006/0052112 | A1 * | 3/2006 | Baussi et al. | 455/456.1 |
| 2009/0231960 | A1 * | 9/2009 | Hutcheson | 368/10 |
| 2010/0109955 | A1 * | 5/2010 | Anguera et al. | 343/702 |

FOREIGN PATENT DOCUMENTS

| | | |
|---|---|---|
| CN | 2 919 569 Y | 7/2007 |
| DE | 10301299 | 7/2003 |
| EP | 0872634 | 10/1998 |
| EP | 1 965502 Al | 9/2008 |
| GB | 2372835 | 3/2005 |

(Continued)

OTHER PUBLICATIONS

International Search Report and Written Opinion in PCT/GB2010/000842, dated Nov. 1, 2011.

*Primary Examiner* — Jinsong Hu
*Assistant Examiner* — William Nealon
(74) *Attorney, Agent, or Firm* — McAndrews, Held & Malloy, Ltd.

(57) ABSTRACT

A portable tracking and communications device (10) comprises a Global Positioning System (GPS) module and a mobile telephony module, the device including at least a first passive, electronic ground plane simulator comprising a pair of essentially grounded antennae (16, 17) that are selectively connectable one to the other via a parallel-connected resistor-capacitance resonator (18, 19), the resonator being tuned to a first predetermined frequency or frequency range.

26 Claims, 2 Drawing Sheets

(56) References Cited

FOREIGN PATENT DOCUMENTS

Figure 1:
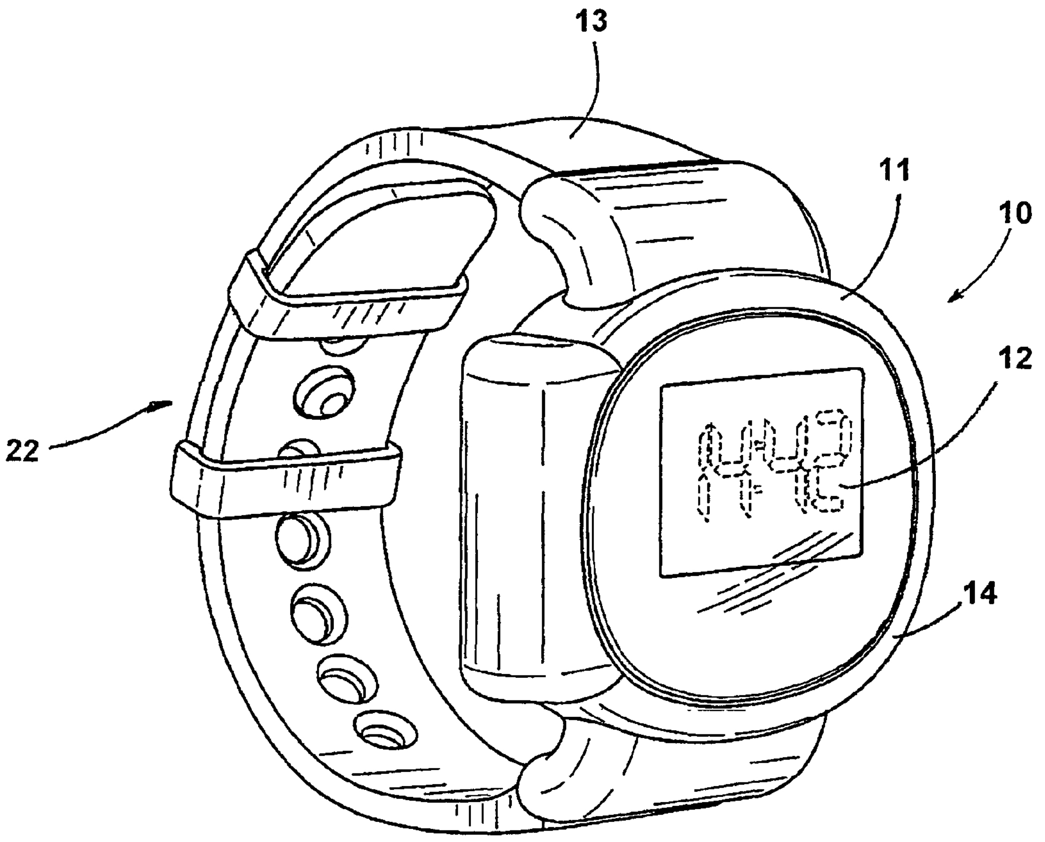

| | | | | | | |
|---|---|---|---|---|---|---|
| GB | 2452909 | | | 3/2009 | | |
| GB | 2447046 | | | 9/2009 | | |
| GB | 2437098 | | | 6/2010 | | |
| WO | 03/034603 | A1 | | 4/2003 | | |
| WO | 2006/031170 | Al | | 3/2006 | | |
| WO | WO 2008/105710 | A1 | * | 9/2008 | ............... | H01Q 1/24 |
| WO | WO 2008/119699 | A1 | * | 10/2008 | ............... | H01Q 1/24 |

* cited by examiner

TRACKING AND COMMUNICATIONS DEVICE

This invention relates to a tracking and communications device.

Communications devices, in the form of mobile telephones and pagers, have become very well known and extremely widespread in use. It was estimated at the end of 2008 that globally there are 4.1 billion mobile telephone accounts worldwide, and that 100,000 new mobile telephone masts were being installed annually. (Source: "Nice talking to you . . . mobile phone use passes milestone", C. Tryhorn, The Guardian 3 Mar. 2009: available at http://www.guardian.co.uk/technology/2009/mar/03/mobile-phones-1).

Electronic tracking devices are also well known. They may take the form of e.g. asset tracking devices that are used by the owners of mobile assets so that they may track their locations remotely.

The asset tracking devices often are secured permanently to the assets typically in obscured parts of them so that the users of the assets (who usually are not the owners) may not prevent the tracking operations from taking place. Asset tracking devices often are intended to operate over relatively short distances (e.g. such as those encountered within a factory or inside a theme park). In such cases relatively short-penetration wireless communications protocols, such as ZigBee and Bluetooth® may be appropriate.

It is also known to provide tracking devices that operate over larger areas, e.g. in respect of road vehicle fleets. The latter kinds of tracking device tend to include at least some of the features of a mobile telephone (such as a telephony module, amplifiers and antennae) and may operate according to a known technique called Cell Identification Triangulation.

Many mobile telephone handsets nowadays include Global Positioning System (GPS) modules. When appropriate mapping software is downloaded to such a handset and activated (usually following payment of service charges to a mobile service operator) the handset may as a result be used as a GPS mapping/location device, displaying the current location of the handset (or an approximation of the location, GPS software being intentionally inaccurate for national security reasons) overlain on stored map images. Many mobile telephone users use their handsets as hand-held or vehicle-located satellite navigation systems following activation of the appropriate software.

One problem with combining GPS and mobile telephone functions in a single, portable device, however, is that the GPRS (General Packet Radio Service) or GSM (Global System for Mobile) signals that a mobile telephone employs for the purpose of sending and transmitting base station polling, caller identification, voice and text message data are roughly 1 million times more powerful than the GPS signals.

The latter are transmitted from twenty four satellites in orbit around the Earth, as is well known. Partly because of limitations in the power sources available in the satellites, and partly because of attenuation of the GPS signals that may occur in the atmosphere, the GPS signal received by a small, portable device that also includes GPRS or GPS transmission and receiving apparatuses is so weak as to be overwhelmed by the relatively high power in the telephony signal. As a result unless precautions are taken to shield the GPS components from the GPRS/GSM signals the latter completely dominate the former with the result that the device is not usable as a locating, tracking or mapping device.

Such precautions may be effected in the relatively large housing of a mobile telephone, but may not be possible in smaller devices.

There is growing commercial, political and technological interest in addition in providing mobile devices the purpose of which is to monitor the locations of individuals, as opposed to inanimate assets.

Clearly in the case of an individual it is not possible to secure a tracking device in such a way as to be unnoticed by the person in question. Moreover it is strongly desirable, from the standpoint of not interfering with the everyday activities of the person to an unacceptable extent, for any tracking device intended to be used on an individual to be miniaturised as far as is possible. This miniaturisation can worsen the problems identified above, if as is likely to be the case the device employs both a mobile telephony module (such as a GPRS or GSM module) and a GPS module in close proximity to one another. In that case the shielding requirement becomes significantly more acute than in the case of a mobile telephone handset.

Monitoring of the locations of individuals has received widespread publicity in connection with the so-called "electronic tagging" of felons, as an alternative to custodial sentencing. The tags used in connection with such individuals may be electronically relatively simple and are manufactured as relatively large items that are secured permanently typically to the ankle of the wearer using robust, locking straps.

Tracking devices intended for personal use do not need to include large display screens and it may not always be necessary for the device to include a stored set of maps. On the other hand such a device must be capable of effectively triangulating its own location, and communicating location data over a large area. The most effective way of achieving such large-scale communication is through the combined use of a mobile telephony module and a GPS module.

The size of an electronic tag for a criminal arises partly because in the case of criminals there arguably is not great concern about the personal comfort and freedom of people whose past behaviour has been regarded as contrary to society's norms. Furthermore "tagged" criminals are apt to try and use significant force or violence for the purpose of removing a secured electronic device, and in order to protect the tag against such action it is necessary to make it resistant to attack and hence of a relatively large size.

In such devices it may be possible to provide GPRS/GSM shielding that is effective, in the same way as in mobile telephone handsets or asset tracking apparatuses, to permit the devices to function as intended.

There exists however a further type of personal monitoring or tracking device, in which the problem of "drowning out" of a GPS signal is considerably more acute than in the case of tags for criminals.

Such devices are intended to provide regularly updated information on the locations of vulnerable, non-criminal individuals, and are referred to herein as being of the "kind described" or the "kind discussed".

Such people include teenagers and other children who have permission to be away from their homes without adult supervision; the confused elderly; those suffering from various forms of mental illness and/or learning difficulty; the residents of care homes, boarding schools and other residential establishments; scout, guide and cadet force groups; and those participating in arduous expeditions such as charity endurance events in remote countryside and/or in bad weather.

In all such cases it is strongly desirable to miniaturise the tracking device as much as possible, partly so as to avoid interfering with the freedom of the user; and partly also to make the device visually as discrete as possible.

For these reasons it has become known to incorporate tracking devices intended for use by non-criminals, such as those mentioned, into wristwatch-type devices that fit by way of a releasable bracelet onto the user's wrist.

The bracelet may include one or more locks for preventing unauthorised removal of the device; but the bracelet does not necessarily need to be as robust as the straps employed in electronic tags. This is because there is relatively little likelihood that the users may use great force in order to try and remove the devices, it usually being necessary only to provide a deterrent to attempts at removal.

Furthermore by manufacturing a tracking device so as to resemble a wristwatch it is possible to disguise its purpose (perhaps by incorporating wristwatch functions alongside the tracking ones). This is likely to be of significance to certain groups of potential users (i.e. fashion-conscious teenagers and children).

However the manufacturing of a tracking device as a wristwatch or similar item acutely worsens the problem of a GPRS or GSM signal overwhelming a GPS signal such that the device might not achieve its intended purpose. Thus there is a need for improved shielding in a portable tracking and communications device that includes both a mobile telephony module and a GPS module.

According to the invention in a first aspect there is provided a portable tracking and communications device comprising a Global Positioning System (GPS) module and a mobile telephony module, the device including at least a first passive, electronic ground plane simulator comprising a pair of essentially grounded antennae that are grounded to a casing of the device and are selectively connectable in parallel one to the other in a circuit that includes a resistor-capacitance resonator, the resonator being tuned to a first predetermined frequency or frequency range and the circuit being connected to provide mobile telephony signals in the device when the antennae are not connected to one another, and GPS signals when the antennae are so connected.

It has surprisingly been found that such an arrangement effectively enlarges the ground plane that results from the connection of a resonator to an antenna, as a result of radiation of energy from two locations in the device.

The use of a ground plane to shield against electromagnetic radiation is, in itself, known. The apparatus of the invention selectively enlarges the ground plane, compared with prior art devices, when it is required to detect GPS signals in order to achieve more effective shielding (through telephony signal attenuation in turn caused by the enlarged ground plane that is tuned, through the choice of frequency of the resonator, to the wavelength of the mobile telephony signals) in a very small volume. The ground plane shield of the device of the invention therefore allows the device to detect the GPS signal in preference to any received mobile telephony/GSM data/GPRS data/CDMA data or SMS signal.

This and the fact that the parts of the apparatus that provide such shielding rely on the operation of a resonator (and hence are a "passive" circuit components that require no additional power source in order to achieve their shielding effect), means that the shielding arrangement of the invention is admirably suited to use in a wristwatch-size device. Hence the apparatus of the invention is very well suited for use as a tracking device intended for non-criminal users as indicated.

Preferably the GPS module and the mobile telephony module each include a respective component that is capable of coupling electromagnetic radiation, especially an electrically conducting (e.g. metal) casing of the GPS module and GSM/mobile telephony module respectively. Thus the arrangement of the invention advantageously makes use of parts of the mobile telephony module and the GPS module that are likely to be present anyway in any design of device intended to operate as a non-criminal personal tracking device.

Conveniently the device includes a microprocessor that is capable of detecting the activity levels of at least the mobile telephony module and, optionally, the GPS module in receiving mobile telephony and GPS signals respectively and is for selectively connecting the antennae to one another. In particular the microprocessor optionally may connect the antennae in dependence on simultaneous detection of high levels of activity of the GPS module and the telephony module.

The use of a microprocessor, that inevitably would be present in any design of personal tracking device, to control switching of the ground plane circuit in dependence on the activity of respectively the GPS module and the mobile telephony module means that the device may be connected to attenuate telephony signals only when required. In consequence the shielding provided in the device is active only at certain times, thereby maximising the telephony signal strength at other times.

A preferred embodiment of the device of the invention includes a second, passive electronic ground plane simulator including a resonator that is tuned to a frequency or a frequency range that is different from that of the first electronic ground plane simulator. This permits the device to be operable for example in respective territories in which mobile telephone signals are transmitted at distinct RF wavelengths.

Preferably the respective components of the GPS module and the mobile telephony module that are capable of coupling electromagnetic radiation are common to the first and second electronic ground plane simulators. This provides a benefit of compactness in the device of the invention, further suiting it for use as a wristwatch-type of device (or another device of a similar size).

In one preferred embodiment of the invention the mobile telephony module is a General Packet Radio System (GPRS) module. Alternatively the module may be, for example, a GSM module or a CDMA (Code Division Multiple Access) module. More than one module type may be present in a device according to the invention.

Conveniently the respective antennae lie in overlapping relation to one another on opposite sides of the device.

It is also preferable that the antennae are separated from one another by a distance in the range 15 mm to 30 mm.

Optionally the device of the invention includes a casing having secured thereto a wristband for releasably securing the device to the wrist of a user. It further is preferable that the wristband includes mutually engageable parts that are lockably securable one to the other in order to secure the device to the wrist of a user; and that the mutually engageable parts include a lock that is securable and/or releasable by way of a key that is distinct from the device.

Such features of the device of the invention render it suitable as a personal tracking device of the kind discussed.

Preferably the device includes a data generation and transmission circuit and at least one transmission antenna for causing transmission of data. In one embodiment according to the invention the data generation and transmission circuit is capable of generating and transmitting data in a short message service (SMS) format. The use of SMS format messages means that the bandwidth required by the device is small, and the data may be transmitted quickly and using relatively low-power electronics.

Conveniently the data generation and transmission circuit is operatively connected to the wristband so as to generate and transmit a data signal on rupturing of the wristband.

Additionally or alternatively the data generation and transmission circuit is operatively connected to one or more of the mutually engageable parts so as to generate and transmit a data signal on separating of the mutually engageable parts one from the other without releasing of the lock.

Also preferably the device includes a liquid crystal display (LCD) or another electronically driven display that is capable of displaying device status information. Such a display is useful when, as specified below, the device of the invention is used as part of a tracking system one purpose of which may be to indicate to the user when he/she has moved outside of a designated area.

To this end the invention includes a tracking and communications system including a portable device as defined hereinabove and including a memory device; and a server that is remote from the device, the server having defined therein a polygonal or circular mapping perimeter that is transmissible to the portable device the memory of which is capable of storing the mapping perimeter superimposed on one or more GPS data sets, the device including a microprocessor that is capable of determining whether the device lies within or outside the mapping perimeter. Optionally the perimeter is superimposed on data sets that are map data sets although in preferred embodiments of the invention the perimeter may be defined entirely numerically, e.g. as pairs of longitude and latitude co-ordinates (in the case of a polygonal perimeter in which the co-ordinate pairs define the sides of the polygon) or a latitude/longitude pair defining a centre point together with a radius value (in the case of a circular perimeter).

One problem extant in tracking and monitoring systems of the general kind to which the invention pertains relates to efficiently determining whether a particular portable tracking/communications device is inside or outside a designated perimeter. As an example, a parent may establish a permitted perimeter, close to a child's home, within which the child may roam freely and outside which the child cannot travel unaccompanied. Although the principle of establishing a predetermined perimeter in software residing on the server is straightforward, the task of establishing whether a particular device that is communicating with the server is inside or outside the perimeter hitherto has involved complicated mathematical algorithms. Such algorithms require considerable computing power to calculate and may as a result lead to a lack of reliability of the system overall.

Therefore optionally although the system of the invention could employ a prior art polygon boundary algorithm, when the mapping perimeter is polygonal preferably the microprocessor includes programmed therein an algorithm that defines a line joining two points so as to intersect the boundary of the polygonal mapping perimeter, the position of the portable device as determined by the GPS module lying on the said line and the microprocessor being capable of determining whether the portable device lies within or outside the polygon by determining how many times the device would cross the perimeter of the polygonal mapping perimeter if it were to move from its instantaneously prevailing position along the said line to the end of the line lying furthest from it. Such an algorithm is computationally straightforward to implement.

Conveniently the mapping perimeter is circular and is defined by longitude and latitude co-ordinates corresponding to a centre point together with a numerical value corresponding to a radius, the microprocessor being capable of calculating the distance of the portable device from the centre point and, if it exceeds the radius, determining that the device lies outside the perimeter.

It is preferable that the microprocessor generates an alert message and causes its transmission via the transmission antenna on the microprocessor determining that the device is outside the perimeter.

Advantageously the server is capable of transmitting data defining the perimeter to the device as an encrypted datagram, and wherein the microprocessor is capable of receiving and decrypting the datagram.

In a preferred embodiment of the invention the microprocessor is capable of generating a further datagram indicating decryption of the data defining the perimeter and causing transmission of the datagram via the transmission antenna to the server.

A personal device of the kind described may not always be in "sight" of a GPS satellite, for example if the user moves indoors.

It is however desirable to establish the position of the device even at such times. To this end the device of the invention preferably includes a microprocessor that is programmed to establish the position of the device according to a technique of cell triangulation identification using the mobile telephony module.

The invention is also considered to reside in a method of using a device or system as defined herein, in particular making use of the mapping and/or cell triangulation arrangements described in the immediately preceding paragraphs and defined in Claims 20-29 hereof.

Figure 2:
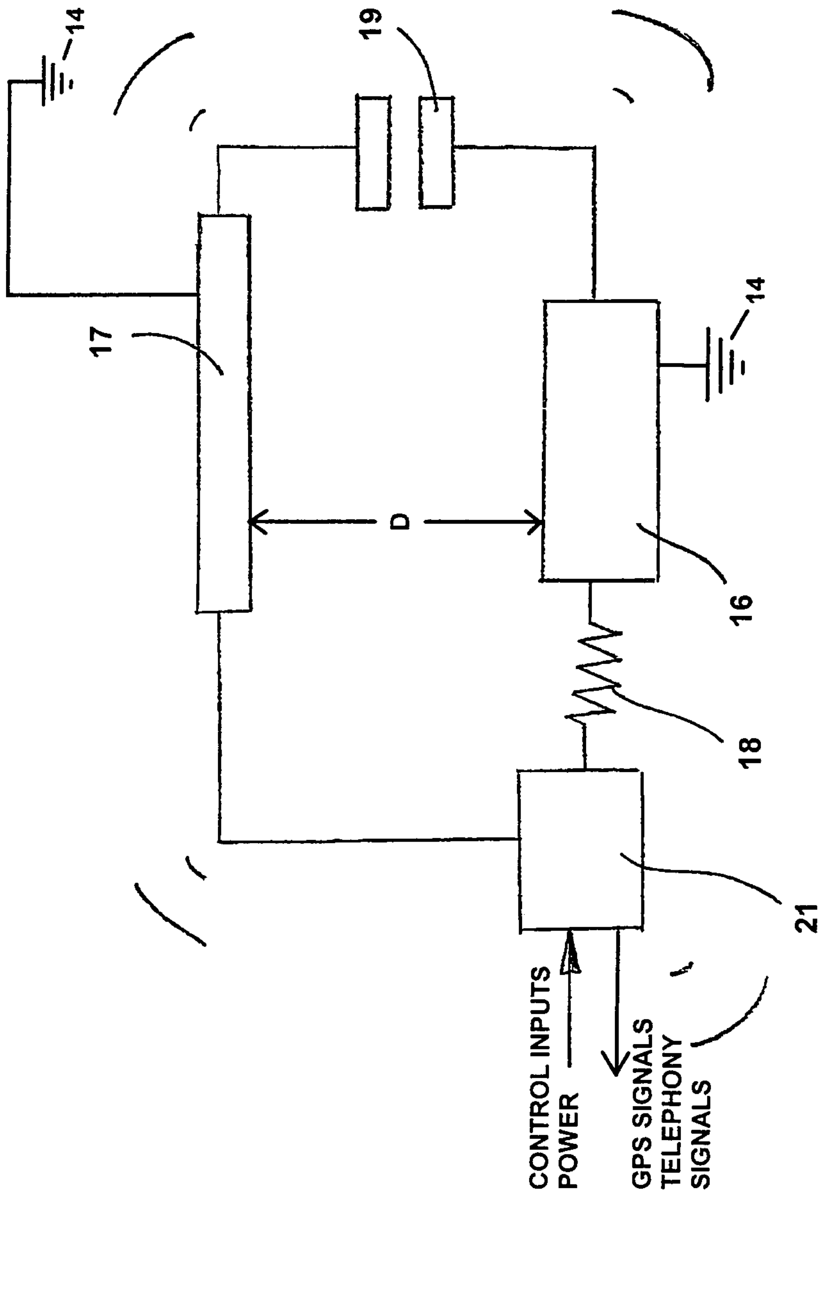

There now follows a description of preferred embodiments of the invention, by way of non-limiting example, with reference to the accompanying drawings in which:

FIG. 1 is a perspective view of a portable tracking and communications device according to the invention comprising a global positioning system (GPS) module and a mobile telephony module, configured as wristwatch-type device; and FIG. 2 is a circuit diagram illustrating the construction of a passive resonator ground plane-extending circuit forming part of the FIG. 1 apparatus.

FIG. 1 shows a device 10 having a wristwatch body 11 including one or more electronically driven display subsystems 12 exemplified in the non-limiting version shown by a liquid crystal display and including secured thereto a wrist bracelet 13 by means of which the device 10 may be secured to the wrist of a user.

Within its housing 14 device 10 includes a GPS module the electrically conducting casing 16 of which is visible in FIG. 2, which shows part of the circuitry incorporated within device 10.

Device 10 also includes incorporated within housing 14 a telephony module the electrically conducting 17 casing of which is also visible in FIG. 2. More than one type of telephone module may be present in a single device 10.

Device 10 includes further components that are well known to the worker of skill in the art as are necessary for causing it to function, in the embodiment shown, as a digital wristwatch and combined tracking/communications device. Thus the device 10 may include components such as a battery pack and microprocessor that are connected to the display, a clock, the GPS module and the telephony module such that these components are controllably operable.

The telephony module may be of any of the types disclosed herein, or of any other type that is suitable for use within a small, portable device such as a wristwatch housing.

The GPS casing 16 and telephony module casing 17 constitute a pair of grounded antennae. As illustrated in FIG. 2, the respective antennae 16, 17 are grounded to the housing 14 and are selectively connectable in parallel to one another to define a circuit including a resistor-capacitance resonator 18, 19 that is tuned to have a resonant frequency in a predetermined range corresponding to the frequency range of the signals transmitted to the telephony module by a telephony base station (transmitter).

The casings (antennae) 16, 17 lie on opposite sides of the interior of the device inside the housing 14. The casings 16, 17 in the preferred embodiment lie essentially in register with one another (i.e. so that substantial portions of the casings 16, 17 would overlap if projected one onto the other) and are spaced apart by a distance D. In preferred embodiments of the invention the value of D lies in the range 15 mm to 30 mm.

The electrically conducting casings 16, 17 together with the resistor 18 and capacitor 19 constitute a passive resonator that as schematically illustrated in FIG. 2 transmits from its nodes so as, in a simulated fashion, to extend the ground plane defined by the resonator.

The principles of electronic ground plane shielding of RF signals are known in themselves. The benefits of the invention relate to extending a simulated ground plane using a circuit that does not require a power source (apart from the signals it dissipates).

The ability of the device 10 to filter out telephony signals at times when it is required to perform GPS functions is strongly enhanced compared with the prior art arrangements. This permits the device when required to attenuate telephony signals and thereby permit the decoding of GPS signals without swamping of those signals.

The device 10 includes a microprocessor 21 that may itself be powered from the battery mentioned hereinabove so as inter alia to switch the circuit shown in FIG. 2 between open-circuit and connected conditions.

The microprocessor 21 is programmed to sample the activity respectively of the GPS module and the telephony module, and to switch the circuit of FIG. 2 in dependence on such activity levels. Thus, for example, when the telephony module polls its base station, or when as described hereinbelow the telephony is receiving or transmitting a datagram, the microprocessor 21 may be programmed to switch the circuit to an open-circuit configuration such that by reason of disconnection of the antennae from one another the extended ground plane described above does not exist. Between base station polling operations, however, it is possible to schedule GPS location actions, or to base the selective switching of GPS actions based on e.g. a GPS signal strength indication. At such times the microprocessor may be arranged to connect the antennae 16,17 together via the parallel circuit visible in FIG. 2. This activates the filter represented thereby so that the device 10 predominantly receives GPS signals at the expense of telephony signals.

As a result of these arrangements the microprocessor 21 may selectively allocate a preferential priority to the GPS signals or the telephony signals, in accordance with e.g. a priority decision tree logic, even when the activity levels of received GPS and telephony signals are simultaneously high.

In the embodiments shown, the casings 16, 17 are made of metal although in other embodiments they may be manufactured from any other electrically conducting substance. The main requirement is that the casings (or other components performing as coupling antennae in the circuit of FIG. 2) are capable of coupling electromagnetic radiation.

In practice the device 10 would include two of the circuits shown in FIG. 2. The aim of this would be to provide circuits that are tuned to distinct frequencies/wavelengths, so that the device 10 is capable of discriminating between GPS and telephony signals even when it moves from one telephony wavelength area to another.

In such an arrangement, there would nonetheless be present only a single GPS module and a single telephony module. Therefore in order to economise on components in the device 10 the casings 16, 17 would serve as common antennae for the respective, differently tuned circuits. As is extremely well known, the precise tuning may be effected through the choice of resistor and capacitor values in the resonator circuit. Two distinct such circuits may be contemplated using different resistors and capacitors in the respective resonators while each being connectable to a common pair of the antennae 16, 17.

The wristband/bracelet 13 visible in FIG. 1 includes mutually engageable parts (represented schematically by components 22) that are lockably securable one to the other in order to secure the device to the wrist of a user. The lock may be securable and/or releasable by way of a key that is distinct from the device 10.

These features render the device 10 suitable for use as one that may be used to track the locations of vulnerable persons such as those listed above. Such people in most circumstances would not be given responsibility for securing and releasing of the bracelet 13, so that those responsible for their well-being can be confident that the device 10 would not be illicitly removed.

Various locking means may be employed, precise details of which will be known to the worker of skill in the relevant art.

The device 10 additionally includes a data generation and transmission circuit and at least one transmission antenna for causing transmission of data. In the preferred embodiment the data generation/transmission circuit is capable of generating and transmitting data in a GPRS format supplemented as desired by SMS format messaging.

As explained hereinabove, sufficient data about the location of the device 10 may be conveyed using GPRS and optionally supplemented by SMS messaging that adopts codes indicating the location of the device 10 in terms of GPS coordinates.

Other transmission devices and protocols may be used in the device 10, which itself need not adopt the form of a wristwatch as shown. However, the wristwatch and SMS/GPRS combination disclosed has been found to be particularly suitable for the required purpose.

In one embodiment of the invention the lock described above and/or another part of the bracelet 13 may be directly or indirectly operatively (i.e. electronically) connected to the data generation/transmission circuit in such a way that opening of the lock without using the correct key, and/or breaking of the bracelet, may generate a data transmission. The data transmitted can include mapping co-ordinate data signifying the location of the device 10 at the time of opening of the lock or another, similar unauthorised activity. The data can also include a specific alert warning e.g. a parent or supervisor e.g. by way of an SMS message of removal of the device from the wearer.

As an example only in this regard the bracelet 13 may include embedded within it one or more wires that when the lock is properly closed connect to provide a resonator of a particular natural frequency in conjunction with other components of the device 10. The lock operation can be such that on authorised unlocking of the lock no signal is transmitted. On the other hand breaking of the bracelet or opening of the lock, without using the key causes the connected, embedded wires to adopt an open circuit configuration. This can be detected in the microprocessor 21 that then generates the location signal transmission as aforesaid.

The display subsystems 12 may include a liquid crystal display device that is capable of displaying the status of the device. Thus the LCD 12 may indicate for example when the device is within and when it is outside a predetermined "safe zone" that may be defined in software on a server to which the data generation/transmission device is operatively connectable by way of GPRS supplemented by SMS message transmissions.

At least two methods exist, within the scope of the invention, for establishing the boundary of the safe zone.

In the first of these, referred to herein as the "Internet Method", a registered user of the system, such as a parent or supervisor, using his/her own personal computer (PC) may access a secure website hosted by or provided for the licensed operator of the system.

After completing any necessary security procedures such as imputing of a password or a key number or code that may be generated e.g. according to known pseudorandom number generation techniques the user may define the safe zone on the secure web page.

The safe zone may be defined as e.g. a circle of predetermined radius centred on a "centre point", or as a polygon enclosing a chosen area. If desired the area enclosed by the polygon also may be defined relative to a centre point, or other reference data.

Examples of typical centre points include but are not limited to the homes of registered users; schools; care homes; hospitals; the premises of youth or social organisations or charities; and the start or finish points of events such as charity events.

Conveniently the user may define the safe zone with the aid of map data available via the website but this need not necessarily be the case. In an alternative method, for example, the user may specify a postal or zip code as a centre point (e.g. by entering it into a query box on the website) and indicate a safe zone circle radius relative to the centre point by way of a further web-page query box.

The data pertaining to the safe zone definition are encrypted in per se known ways so as to result in a transport layer and an encryption layer that are suitable for secure sockets layer (SSL) or transport layer security (TLS) encrypted data transfer.

Thereafter the encrypted safe zone data are transmitted to a central server operated by the licensed operator of the system. The central server formats the safe zone data to a "device compatible" format (i.e. a format that is suitable for transmission to the device 10 of the invention).

The safe zone information is transmitted from the central server to the device 10 as a datagram using an Internet User Datagram Protocol (UDP) via a cellular GPRS wireless link.

The second method of creating the safe zone is referred to herein as the "SMS Method". Instead of using the Internet as described above makes use of short message service (SMS) command messages input via the keyboard or touchscreen of a device such as a cellular mobile telephone or wireless personal digital assistant (PDA).

Using such a device the user (parent, supervisor, school teacher, etc) enters a command consisting of a command name and a radius. As an example an SMS message of the form SAFE250 could be used to cause a device 10 to establish a circular safe zone, having a radius of 250 m centered on the current location of the device 10.

Receipt of such a command would initially cause the device 10 to activate its GPS module, lock on to appropriate GPS triangulation signals and as a result determine its current position as GPS co-ordinates. This calculated current position would then be used as the safe zone centre point.

The device 10 then transmits the current position and safe zone as radius e.g. a GPRS datagram to the central server mentioned above.

The central server may send confirmation of settings of the safe zone (e.g. as an email) to the registered user's PC and (e.g. as a further SMS) to the mobile device from which the command was sent. The sending of such confirmation messages to some extent obviates the known unreliability of UDP data transmissions.

Regardless of whether the Internet Method or the SMS Method is used to create the safe zone when stored in a PC, the central server or the device 10 the data file typically will adopt the format of an encrypted hexadecimal file containing latitude and longitude pairs and/or a radius.

A polygonal safe zone may in this way be defined as a series of latitude/longitude pairs defining the ends of the sides of the polygon. A circular safe zone can be defined as a latitude value and a longitude value specifying a centre point; and a numerical value defining the circle radius.

The device 10 may form part of a tracking and communication system that additionally includes a memory device and the aforesaid server that are remote from the device, the server having defined therein the circular or polygonal mapping perimeter that as described is transmissible to the portable device.

The memory of the server and the device 10 are capable of storing the mapping perimeter in a form superimposed on one or more GPS map data sets.

The microprocessor 21 of the device 10 is programmed to determine whether the device lies within or outside a perimeter of the kind indicated above.

If the perimeter is polygonal (whether of regular or irregular polygonal shape) it is possible for the microprocessor 21 to determine this location relative to the perimeter by mapping a line (that in the preferred embodiment is a straight line) having its origin at the device and terminating beyond the polygon so as to intersect the boundary of the perimeter. If in the space between the device and the end of the line remote from the device 10 the line intersects the boundary an odd number of times, the microprocessor 21 may conclude that it lies within the polygon; and if the number of intersections is even the microprocessor may deduce that the device lies outside the polygon. Establishing of the mapping line may take place according to an iterative technique, that results in a line that crosses the boundary of the perimeter a maximum number of times. Once the microprocessor 21 has identified such a line, determination of whether the device 10 lies within or outside the polygon is a straightforward, arithmetic calculation.

In more detail, the preferred form of perimeter sensing algorithm operates to test at least one, and as necessary two, co-ordinates transmitted as the location of the device 10 and referred to as "x" and "y" co-ordinates corresponding e.g. to x- and y-mapping grid co-ordinates.

The algorithm functions by defining each side of the polygonal perimeter as a pair of points; and testing initially the $m^{th}$ and $n^{th}$ sides (being respectively the "first" and "last" sides of the series defining the polygon) relative to the y-co-ordinate returned by the device 10 in order to establish whether (i) the y-co-ordinate value of the first ($m^{th}$) side is less than the y-co-ordinate value of the device and at the same time whether (ii) the y-co-ordinate value of the last ($n^{th}$) side is greater than the y-co-ordinate value of the device.

The algorithm then tests in turn pairs of sides represented as the $(m+1)^{th}$ and $(n+1)^{th}$ sides (in which, logically, the $(n+1)^{th}$ side is the side previously designated the $m^{th}$ side), the $(m+2)^{th}$ and $(n+2)^{th}$ side and so on, until all the sides of the polygon are tested.

If at the end of this sequence of tests the y-co-ordinate returned by the device lies outside the y-co-ordinate of any side of the perimeter (i.e. the $(m+q)^{th}$ perimeter y-co-ordinate value is greater than that of the y-co-ordinate returned by the device and the $(n+q)^{th}$ perimeter value being greater than the value of the y-co-ordinate returned by the device 10, q having an integer value between zero and one less than the total number of sides of the perimeter) the algorithm then tests the x-co-ordinate value returned by the device in a similar, iterative fashion relative to the values of the x-co-ordinates of pairs of sides defining the polygon.

If the x-co-ordinate returned by the device 10 also lies outside one or more of the sides when tested relative to the x-co-ordinate values the algorithm concludes that the device 10 lies outside the perimeter, and sets a warning flag as desired. This in turn may result in the generation of a warning message such as an SMS message sent to a designated mobile telephone number, or a software-generated warning that displays on the screen of the computer of a supervisor of the wearer of the device 10.

The algorithm or another algorithm operated by the microprocessor 21 may readily also test whether the device 10 lies within a circular perimeter, by simply calculating the distance of the x and y co-ordinates returned by the device 10 from the centre of the perimeter; and establishing whether in either case the distance is greater than the radius of the circle.

The device 10 also is capable of using cell triangulation identification techniques, employing the telephony signals as contrasted with the GPS signals that it receives, in order to establish its location when it is unable to receive a GPS signal (as is the case for example when the device is inside a building).

The cell triangulation algorithm may operate by establishing firstly the number of mobile telephony cells (up to a maximum of 6) with which the device 10 is in communication; and secondly calculating the latitudinal and longitudinal co-ordinates of those cells. The longitude and latitude data are successively added to incrementing registers until data on all the available (i.e. in-contact) cells have been processed. At that time the algorithm divides the cumulative longitude and latitude totals in the registers by the number of cells tested in order to obtain average longitude and latitude values for the device itself.

The calculation involves allocating a timing advance value to each cell with which the device 10 is in data transmitting contact; and then employing the value in order to calculate the distance of the device 10 from the cell in question.

The distance data are then used to calculate longitude and latitude values resulting in the location of the cell, according to geometric calculations.

It is necessary to perform the longitude and latitude calculations based on a plural number of cells since the calculation made with reference to only a single cell would be accurate to within only 550 meters in each co-ordinate direction, and it is desirable to calculate the location of the device 10 to a greater degree of accuracy.

In addition to the foregoing the display 12 may indicate for example a low battery warning; warning messages relating either to the location of the device or the status of the tracking system; and (when the device is operated in the mode of a conventional watch) time and date information.

To this end the device 10 may if desired include watch components such as a resonator clock, splitter circuitry, amplifiers and signal conditioning devices as are entirely conventional in a digital watch device.

The device 10 may optionally include other display/alert subsystems such as but not limited to an audible alarm or a vibrating alert device. The operative incorporation of such devices will be within the ability of the skilled reader.

Although not specifically claimed herein, the invention is considered to reside in methods of locating (i.e. determining and, as desired, transmitting the position of) the device of the invention, as described herein.

The listing or discussion of an apparently prior-published document in this specification should not necessarily be taken as an acknowledgement that the document is part of the state of the art or is common general knowledge.

The invention claimed is:

1. A device comprising:

a housing;

a Global Positioning System (GPS) module including a casing;

a mobile telephony module including a casing;

memory configured to store a mapping perimeter;

a processor configured to determine whether the device lies inside or outside the mapping perimeter;

a first circuit comprising a plurality of antennae each grounded to the housing, wherein the plurality of antennae are selectively connectable in parallel to each other with circuitry including a resistor-capacitor resonator; and wherein:

the resistor-capacitor resonator is tuned to at least one of a first predetermined frequency or a first predetermined frequency range;

the circuit is configured to provide mobile telephony signals in the device when the plurality of antennae are not connected to one another;

the circuit is configured to provide GPS signals when the plurality of antennae are connected to one another the casing of the GPS module; and the casing of the mobile telephony module comprise the plurality of antennae.

2. The device according to claim 1 including a microprocessor programmed to selectively connect the plurality of antennae to one another.

3. The device according to claim 2 wherein the microprocessor is programmed to detect activity levels of at least the mobile telephony module in receiving mobile telephony signals and connect the plurality of antennae in dependence on the detected activity levels.

4. The device according to claim 1 including a second circuit including a resonator tuned to a second frequency or a second frequency range different from the first predetermined frequency or the first predetermined frequency range.

5. The device according to claim 4 wherein the respective components of the GPS module and the mobile telephony module are common to the first and second circuits.

6. The device according to claim 1 wherein the mobile telephony module comprises a General Packet Radio System (GPRS) module.

7. The device according to claim 1 wherein two of the plurality of antennae lie in overlapping relation to one another on opposite sides of the device.

8. The device according to claim 7 wherein two of the plurality of antennae are separated from one another by a distance in the range 15 mm to 30 mm.

9. The device according to claim 1 including a wristband secured to the housing, wherein the wristband is configured to releasably secure the device to a wrist of a user.

10. The device according to claim 9 wherein the wristband includes mutually engageable parts lockably securable one to another in order to secure the device to the wrist of the user.

11. The device according to claim 10 wherein the mutually engageable parts include a lock selectively securable and releasable by way of a key distinct from the device.

12. The device according to claim 11 including a data generation and transmission circuit and at least one transmission antenna configured to cause transmission of data.

13. The device according to claim 12 wherein the data generation and transmission circuit is capable of generating and transmitting data in at least one of GPRS format or short message service (SMS) format.

14. The device according to claim 12 wherein the data generation and transmission circuit is operatively connected to a wristband so as to generate and transmit a data signal on rupturing of the wristband.

15. The device to claim 12 wherein the data generation and transmission circuit is operatively connected at least one of the mutually engageable parts so as to generate and transmit a data signal on separating of the mutually engageable parts one from another without releasing of the lock.

16. The device according to claim 1 including a liquid crystal display (LCD) that is capable of displaying device status information.

17. A system including:

a device comprising:

a housing;

a Global Positioning System (GPS) module including a casing;

a mobile telephony module including a casing;

a circuit comprising a plurality of antennae each grounded to the housing, wherein the plurality of antennae are selectively connectable in parallel to each other with circuitry including a resistor-capacitor resonator;

a memory; and a microprocessor;

wherein:

the resistor-capacitor resonator is tuned to at least one of a first predetermined frequency or a first predetermined frequency range;

the circuit is configured to provide mobile telephony signals in the device when the plurality of antennae are not connected to one another;

the circuit is configured to provide GPS signals when the plurality of antennae are connected to one another; and the casing of the GPS module and the casing of the mobile telephony module comprise the plurality of antennae; and a server remote from the device, wherein:

the server has defined therein a polygonal or circular mapping perimeter transmissible to the device;

the memory of the device is capable of storing the mapping perimeter; and the microprocessor of the device is capable of determining whether the device lies within or outside the mapping perimeter.

18. The system according to claim 17 wherein the perimeter is superimposed on at least one mapping data set.

19. The system according to claim 17 wherein when the mapping perimeter is polygonal; and wherein the microprocessor includes programmed therein an algorithm that defines a line joining two points so as to intersect a boundary of a polygonal mapping perimeter, and wherein the position of the device as determined by the GPS module lying on the said line and the microprocessor is capable of determining whether the device lies within or outside the polygon by determining how many times the device would cross the perimeter of the polygonal mapping perimeter if it were to move from its instantaneously prevailing position along the said line to an end of the line lying furthest from it.

20. The system according to claim 17 wherein the mapping perimeter is circular and is defined by longitude and latitude coordinates corresponding to a center point together with a numerical value corresponding to a radius, and wherein the microprocessor is capable of calculating a distance of the device from the center point and, if it exceeds the radius, determining that the device lies outside the perimeter.

21. The system according to claim 17 wherein the microprocessor generates an alert message and causes its transmission via the transmission antenna on the microprocessor determining that the device is outside the perimeter.

22. The system according to claim 17 wherein the server is capable of transmitting data defining the perimeter to the device as an encrypted datagram, and wherein the microprocessor is capable of receiving and decrypting the datagram.

23. The system according to claim 22 wherein the microprocessor is capable of generating a further datagram indicating decryption of the data defining the perimeter and causing transmission of the datagram via the transmission antenna to the server.

24. The system according to claim 17 including a portable device capable of transmitting SMS data messages, further defining the mapping perimeter, from the further device to the portable device in order to define the perimeter therein.

25. The system according to claim 24 wherein the server is capable of transmitting a further SMS message to the further device following decryption of the data defining the perimeter by the microprocessor.

26. The device according to claim 1 including a microprocessor that is programmed to establish the position of the device according to a technique of cell triangulation identification using the mobile telephony module.

* * * * *